US010930077B1

(12) United States Patent
Newcombe et al.

(10) Patent No.: US 10,930,077 B1
(45) Date of Patent: Feb. 23, 2021

(54) SYSTEMS AND METHODS FOR RENDERING AUGMENTED REALITY MAPPING DATA

(71) Applicant: Facebook Technologies, LLC, Menlo Park, CA (US)

(72) Inventors: Richard Andrew Newcombe, Seattle, WA (US); Jakob Julian Engel, Seattle, WA (US); Julian Straub, Redmond, WA (US); Thomas John Whelan, Redmond, WA (US); Steven John Lovegrove, Woodinville, WA (US); Yuheng Ren, Newcastle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/131,068

(22) Filed: Sep. 14, 2018

(51) Int. Cl.
| | |
|---|---|
| *G06T 19/00* | (2011.01) |
| *G06K 9/00* | (2006.01) |
| *G06T 7/73* | (2017.01) |
| *G06T 17/05* | (2011.01) |
| *G06T 15/20* | (2011.01) |

(52) U.S. Cl.
CPC ........ *G06T 19/006* (2013.01); *G06K 9/00671* (2013.01); *G06T 7/74* (2017.01); *G06T 15/20* (2013.01); *G06T 17/05* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 2012/0280988 | A1* | 11/2012 | Lampotang | G06T 19/20 345/419 |
| 2013/0038707 | A1* | 2/2013 | Cunningham | A61B 1/0005 348/65 |
| 2013/0314442 | A1* | 11/2013 | Langlotz | G06T 19/006 345/633 |
| 2019/0033989 | A1* | 1/2019 | Wang | G06F 3/0346 |

* cited by examiner

*Primary Examiner* — Yi Wang
(74) *Attorney, Agent, or Firm* — FisherBroyles, LLP (57) ABSTRACT

The disclosed computer-implemented method may include determining a local position and a local orientation of a local device in an environment and receiving, by the local device and from a mapping system, object data for objects within the environment. The object data may include position data and orientation data for the objects and relationship data between the objects. The method may also include deriving, based on the object data received from the mapping system, and the local position and orientation of the local device, a contextual rendering of the objects that provides contextual data that modifies a user's view of the environment. The method may include displaying, using the local device, the contextual rendering of at least one of the plurality of objects to modify the user's view of the environment. Various other methods, systems, and computer-readable media are also disclosed.

20 Claims, 8 Drawing Sheets

SYSTEMS AND METHODS FOR RENDERING AUGMENTED REALITY MAPPING DATA

BACKGROUND

Augmented reality (AR) devices typically augment a user's real-world environment with computer-generated information. For example, AR devices may alter a user's perception of his or her real-world environment by overlaying visual information onto the user's normal view. By doing so, AR devices may provide an immersive experience for end users without completely replacing the user's view of their real-world environment.

AR devices may be used for games and other interactive entertainment applications. For example, AR applications often display virtual objects as if the virtual objects were in the real world. Users may then interact with the virtual objects. As AR devices become more common, however, users may wish to use AR technology to further enhance their perception of real-world environments.

SUMMARY

As will be described in greater detail below, the instant disclosure describes a system capable of displaying contextual data associated with a real-world environment in order to enhance a user's view of the same. In one example, a computer-implemented method for performing such a task may include determining a local position and a local orientation of a local device in an environment and receiving, by the local device and from a mapping system, object data for a plurality of objects within the environment. The object data may include position data and orientation data for each of the plurality of objects and relationship data between the plurality of objects. The method may also include deriving, based on the object data received from the mapping system, the local position of the local device, and the local orientation of the local device, a contextual rendering of at least one of the plurality of objects that provides contextual data that modifies a user's view of the environment, and displaying, using the local device, the contextual rendering of at least one of the plurality of objects to modify the user's view of the environment.

In some examples, the method may further include sending, to the mapping system, the local position and the local orientation of the local device, selecting, by the mapping system, the plurality of objects based on the local position and the local orientation of the local device, and selecting, by the mapping system, the object data for the selected plurality of objects. Selecting the object data for the plurality of objects may be further based on contextual settings.

In some examples, the contextual rendering may be derived based on contextual settings. The contextual settings may include at least one of identifying objects, hiding visible objects, showing occluded objects, showing past states of objects, showing current states of objects, identifying interactions between objects, or playing audio outside of detection by the local device.

In some examples, deriving the contextual rendering may further include determining whether at least one of the plurality of objects is occluded in the user's view of the environment based on both the local position and the local orientation of the local device and the position data of at least one of the plurality of objects, and rendering a contextual representation of at least one of the plurality of objects when at least one of the plurality of objects is occluded in the user's view of the environment and the contextual settings indicate showing occluded objects. The contextual representation may comprise at least one of an outline rendering, an opaque rendering, a transparent rendering, or an icon.

In some examples, deriving the contextual rendering may further comprise determining whether at least one of the plurality of objects is visible in the user's view of the environment based on both the local position and the local orientation of the local device and the position data of the at least one of the plurality of objects, and rendering a contextual representation of at least one of the plurality of objects when at least one of the plurality of objects is visible in the user's view of the environment and the contextual settings indicate hiding visible objects. The contextual representation may comprise at least one of an outline rendering, a transparent rendering, or an icon.

In some examples, deriving the contextual rendering may further comprise determining, based on the contextual settings, whether to render additional contextual data related to at least one of the plurality of objects, and including, in the contextual rendering, the additional contextual data. The additional contextual data may comprise at least one of a rendering corresponding to a past state, an indication of an interaction between objects, or an audio file. In some examples, the plurality of objects may include a virtual object.

In addition, a corresponding system for rendering AR mapping data may include one or more processors and a memory device comprising instructions that, when executed by the one or more processors, cause the system to determine a local position and a local orientation of a local device in an environment and receive, by the local device and from a mapping system, object data for a plurality of objects within the environment. The object data may include position data and orientation data for each of the plurality of objects and relationship data between the plurality of objects. The instructions may further cause the system to derive, based on the object data received from the mapping system, the local position of the local device, and the local orientation of the local device, a contextual rendering of at least one of the plurality of objects that provides contextual data that modifies a user's view of the environment, and display, using the local device, the contextual rendering of at least one of the plurality of objects to modify the user's view of the environment.

In some examples, the instructions may further comprise instructions for sending, to the mapping system, the local position and the local orientation of the local device, selecting, by the mapping system, the plurality of objects based on the local position and the local orientation of the local device, and selecting, by the mapping system, the object data for the selected plurality of objects.

In some examples, the contextual rendering may be derived based on contextual settings. The contextual settings may include at least one of identifying objects, hiding visible objects, showing occluded objects, showing past states of objects, showing current states of objects, identifying interactions between objects, or playing audio outside of detection by the local device.

In some examples, deriving the contextual rendering may further comprise determining whether at least one of the plurality of objects is occluded in the user's view of the environment based on both the local position and the local orientation of the local device and the position data of at least one of the plurality of objects, and rendering a contextual representation of at least one of the plurality of objects when at least one of the plurality of objects is occluded in the user's view of the environment and the contextual settings indicate showing occluded objects. The contextual representation may include at least one of an outline rendering, an opaque rendering, a transparent rendering, or an icon.

In some examples, deriving the contextual rendering may further comprise determining whether at least one of the plurality of objects is visible in the user's view of the environment based on both the local position and the local orientation of the local device and the position data of the at least one of the plurality of objects, and rendering a contextual representation of at least one of the plurality of objects when at least one of the plurality of objects is visible in the user's view of the environment and the contextual settings indicate hiding visible objects. The contextual representation comprises at least one of an outline rendering, a transparent rendering, or an icon.

In some examples, deriving the contextual rendering may further comprise determining, based on the contextual settings, whether to render additional contextual data related to at least one of the plurality of objects, and including, in the contextual rendering, the additional contextual data. The additional contextual data may comprise at least one of a rendering corresponding to a past state, an indication of an interaction between objects, or an audio file.

In some examples, the above-described method may be encoded as computer-readable instructions on a computer-readable medium. For example, a computer-readable medium may include one or more computer-executable instructions that, when executed by at least one processor of a computing device, may cause the computing device to determine a local position and a local orientation of a local device in an environment and receive, by the local device and from a mapping system, object data for a plurality of objects within the environment. The object data may include position data and orientation data for each of the plurality of objects and relationship data between the plurality of objects. The instructions may cause the computing device to derive, based on the object data received from the mapping system, the local position of the local device, and the local orientation of the local device, a contextual rendering of at least one of the plurality of objects that provides contextual data that modifies a user's view of the environment, and display, using the local device, the contextual rendering of at least one of the plurality of objects to modify the user's view of the environment.

In some examples, the computer-readable medium may further comprise instructions for sending, to the mapping system, the local position and the local orientation of the local device, selecting, by the mapping system, the plurality of objects based on the local position and the local orientation of the local device, and selecting, by the mapping system, the object data for the selected plurality of objects.

In some examples, the contextual rendering may be derived based on contextual settings. The contextual settings may include at least one of identifying objects, hiding visible objects, showing occluded objects, showing past states of objects, showing current states of objects, identifying interactions between objects, or playing audio outside of detection by the local device.

In some examples, deriving the contextual rendering may further comprise determining, based on the contextual settings, whether to render additional contextual data related to at least one of the plurality of objects, and including, in the contextual rendering, the additional contextual data. The additional contextual data comprises at least one of a rendering corresponding to a past state, an indication of an interaction between objects, or an audio file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for rendering AR mapping data. As will be explained in greater detail below, embodiments of the instant disclosure may involve determining the local position and orientation of a local device (such as an AR device) in an environment. The local device may then receive object data from an AR-mapping system that includes position and orientation data for, and relationship data between, a plurality of objects within the environment. Using the object data (in combination with its known local position and orientation), the local device may derive a contextual rendering for at least one of the objects that modifies a user's view of the environment. The local device may then display the contextual rendering to augment the user's view.

By doing so, the disclosed systems may provide an end user with contextual information about his or her environment that the user would not normally be able to perceive. For example, by wearing AR glasses operating in accordance with the disclosed systems, a user may be able to see through walls, see the past (by, e.g., visualizing the movement of objects or people over time), quickly identify the location of remote or unseen objects, hear through walls, etc. Accordingly, the disclosed systems may improve existing AR technology by providing a system capable of enhancing a user's view and understanding of their local environment in ways that would not normally be physically possible, effectively giving the user "superhuman" powers and abilities.

Figure 1:
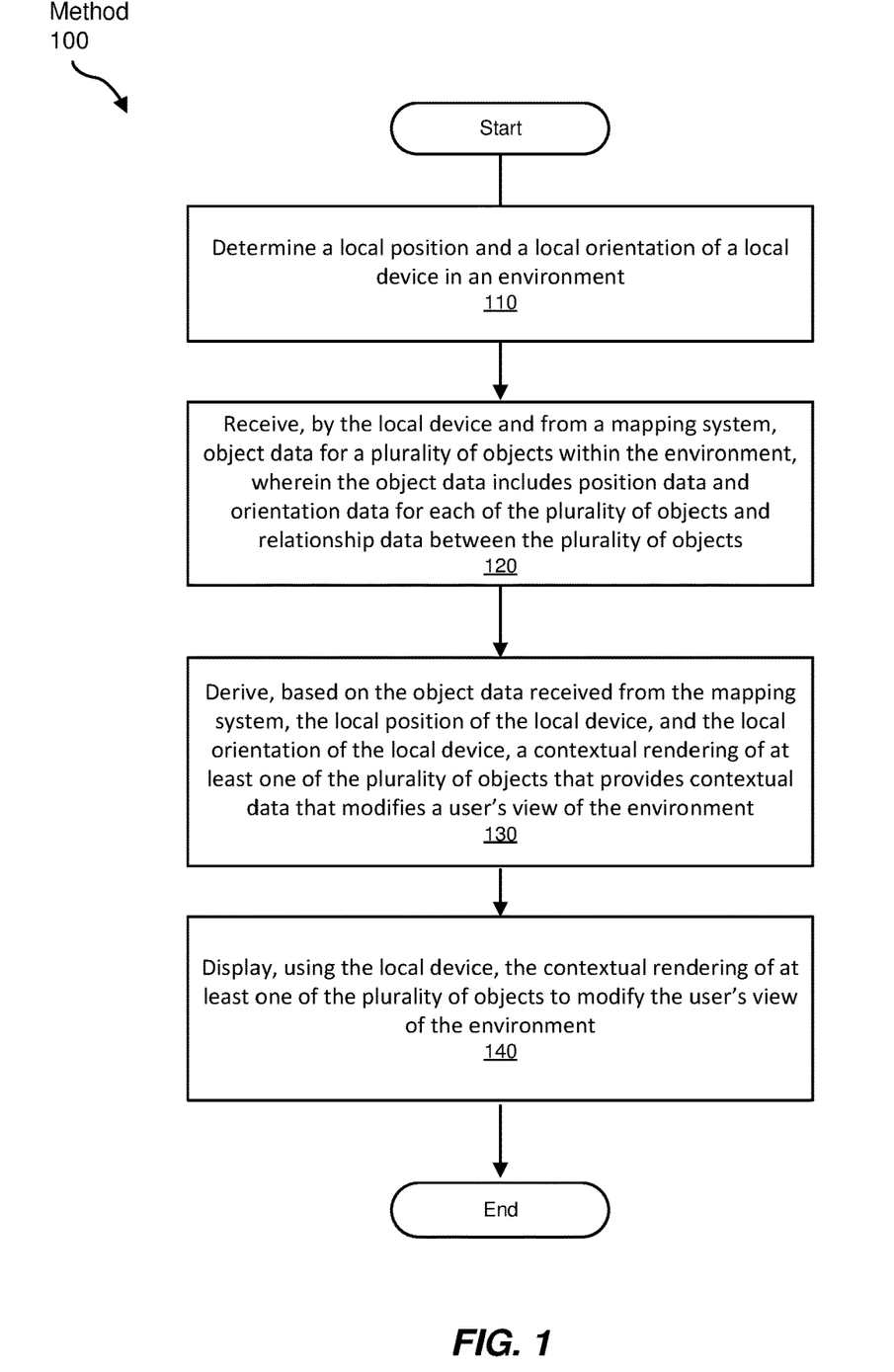
FIG. 1 is a flow diagram of an exemplary method for AR rendering for a mapping system, according to aspects of the present disclosure.
Figure 2:
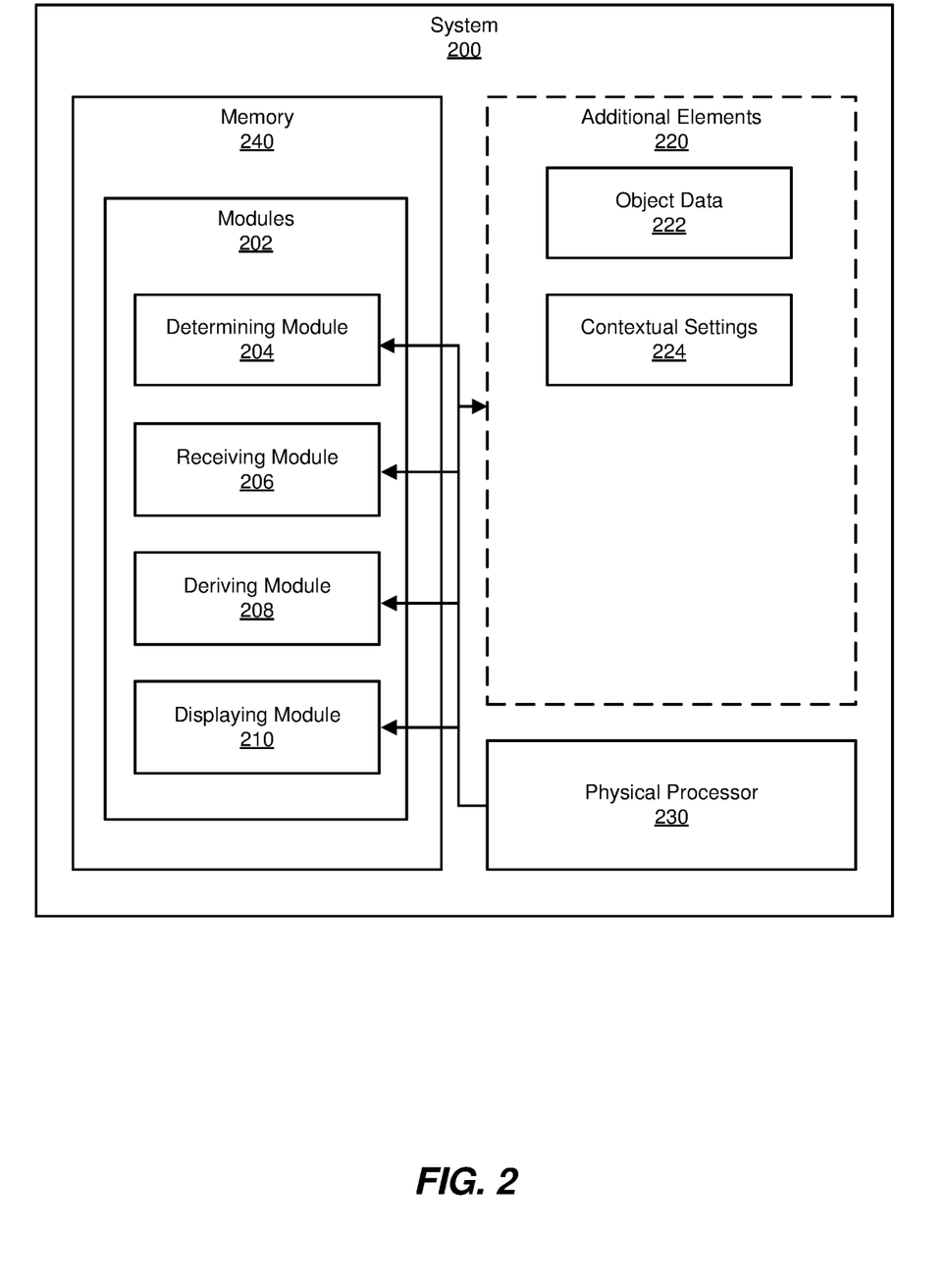
FIG. 2 is a block diagram of an exemplary system for an AR-mapping rendering system, according to aspects of the present disclosure.
Figure 3:
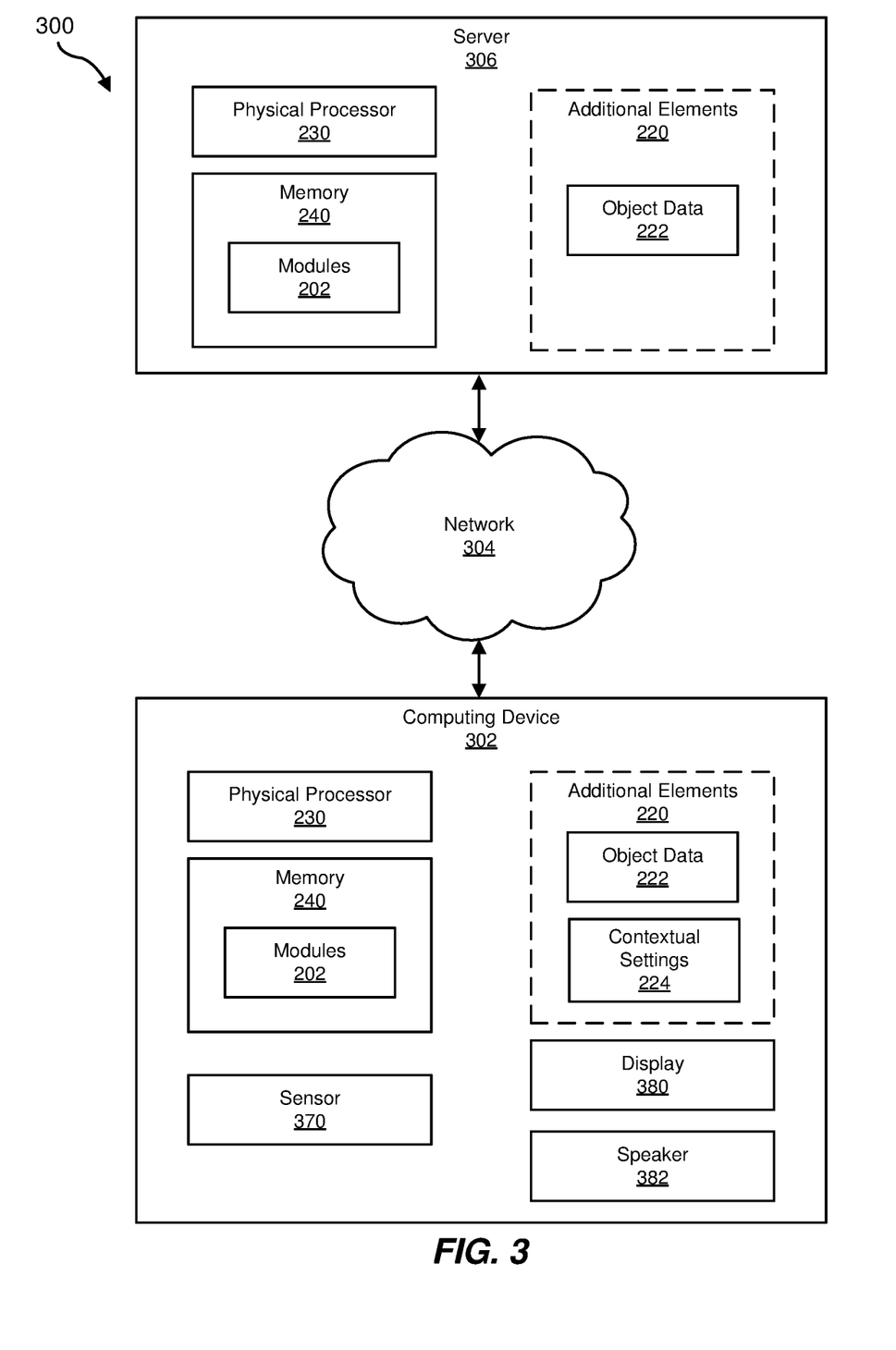
FIG. 3 is a block diagram of an exemplary network for the AR-mapping rendering system, according to aspects of the present disclosure.
Figure 4:
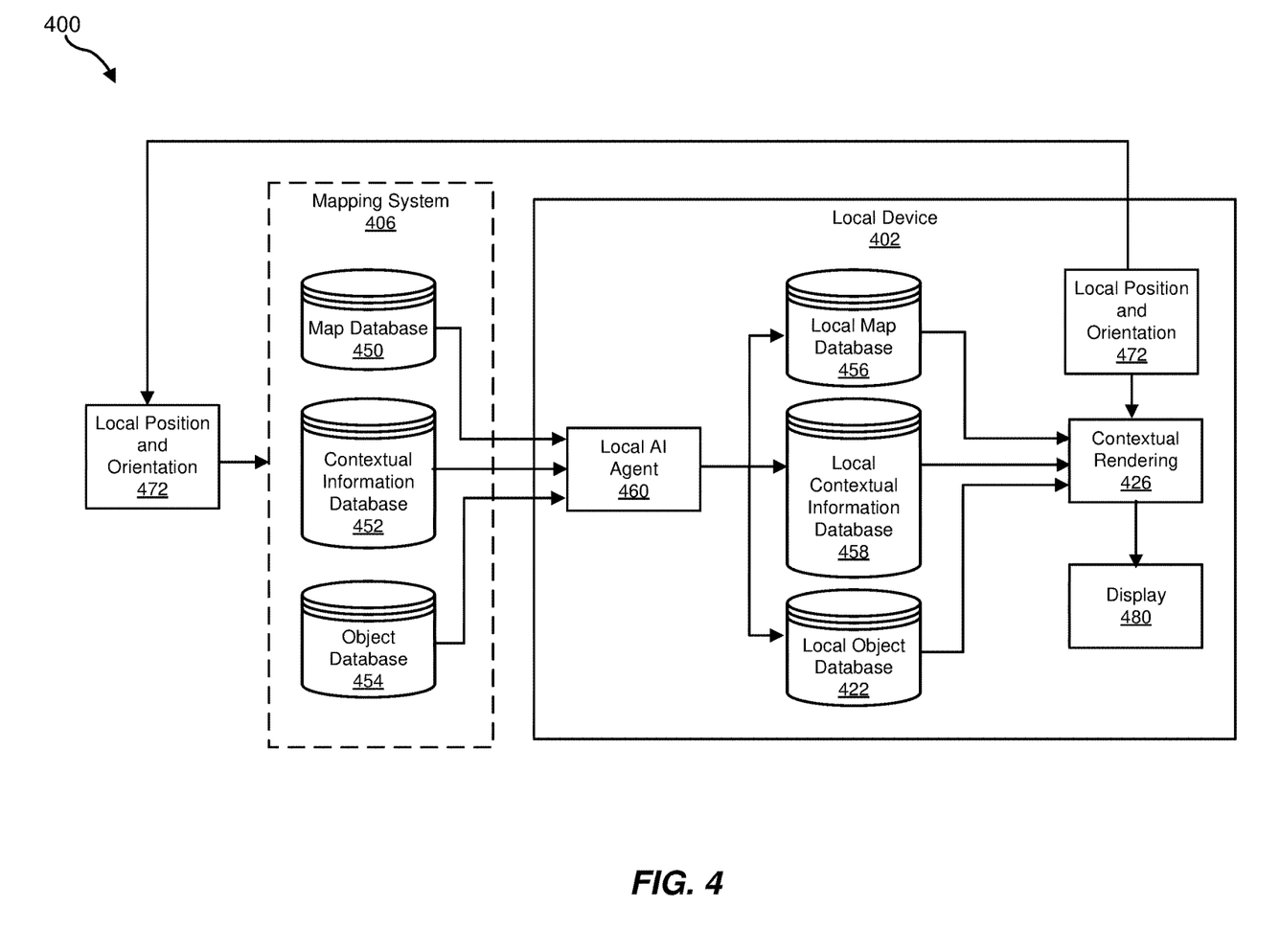
FIG. 4 is a diagram of an exemplary pipeline for an AR-mapping rendering system, according to aspects of the present disclosure.
Figure 5:
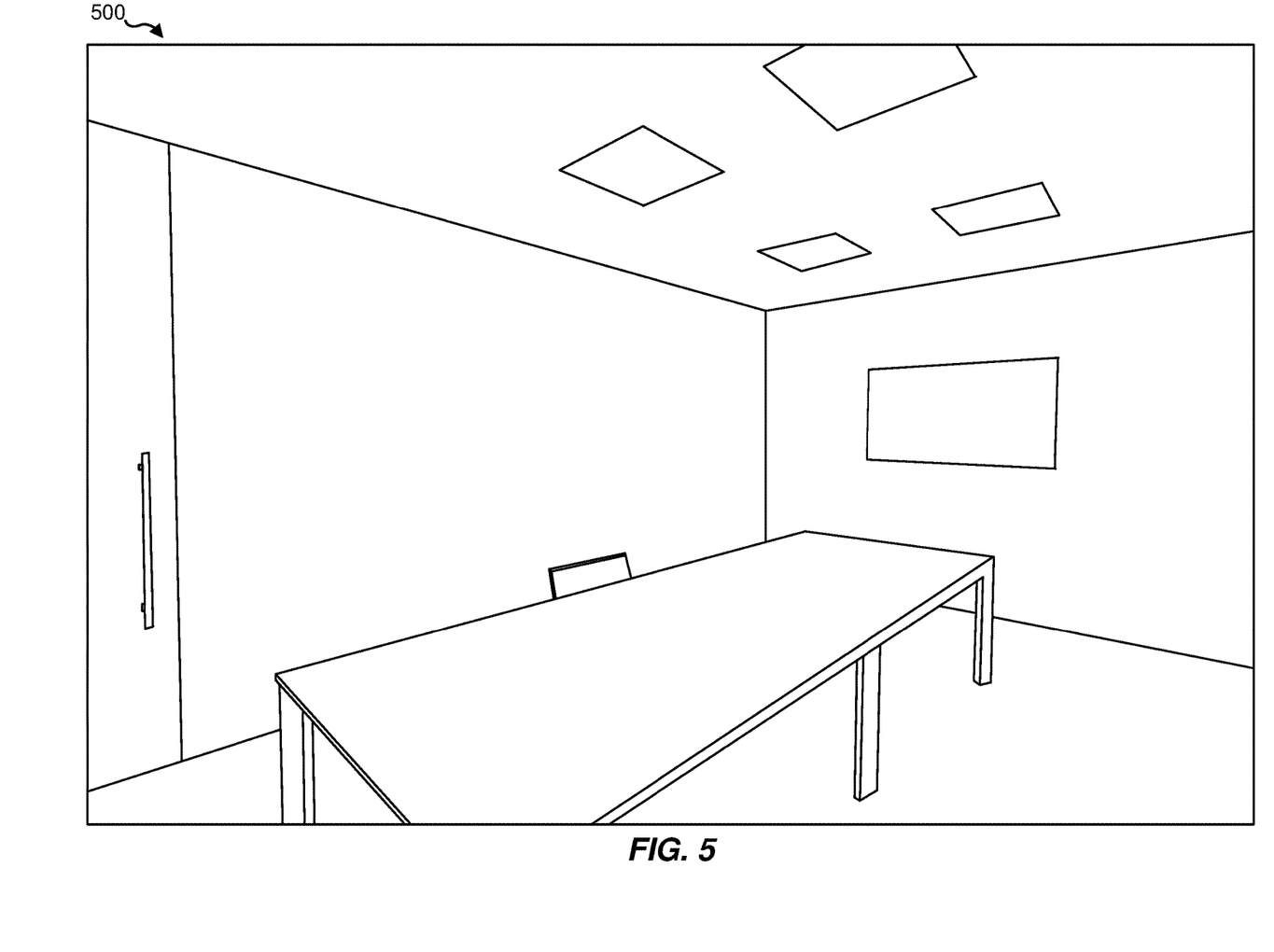
FIG. 5 is a depiction of a user's view of an environment, according to aspects of the present disclosure.
Figure 6:
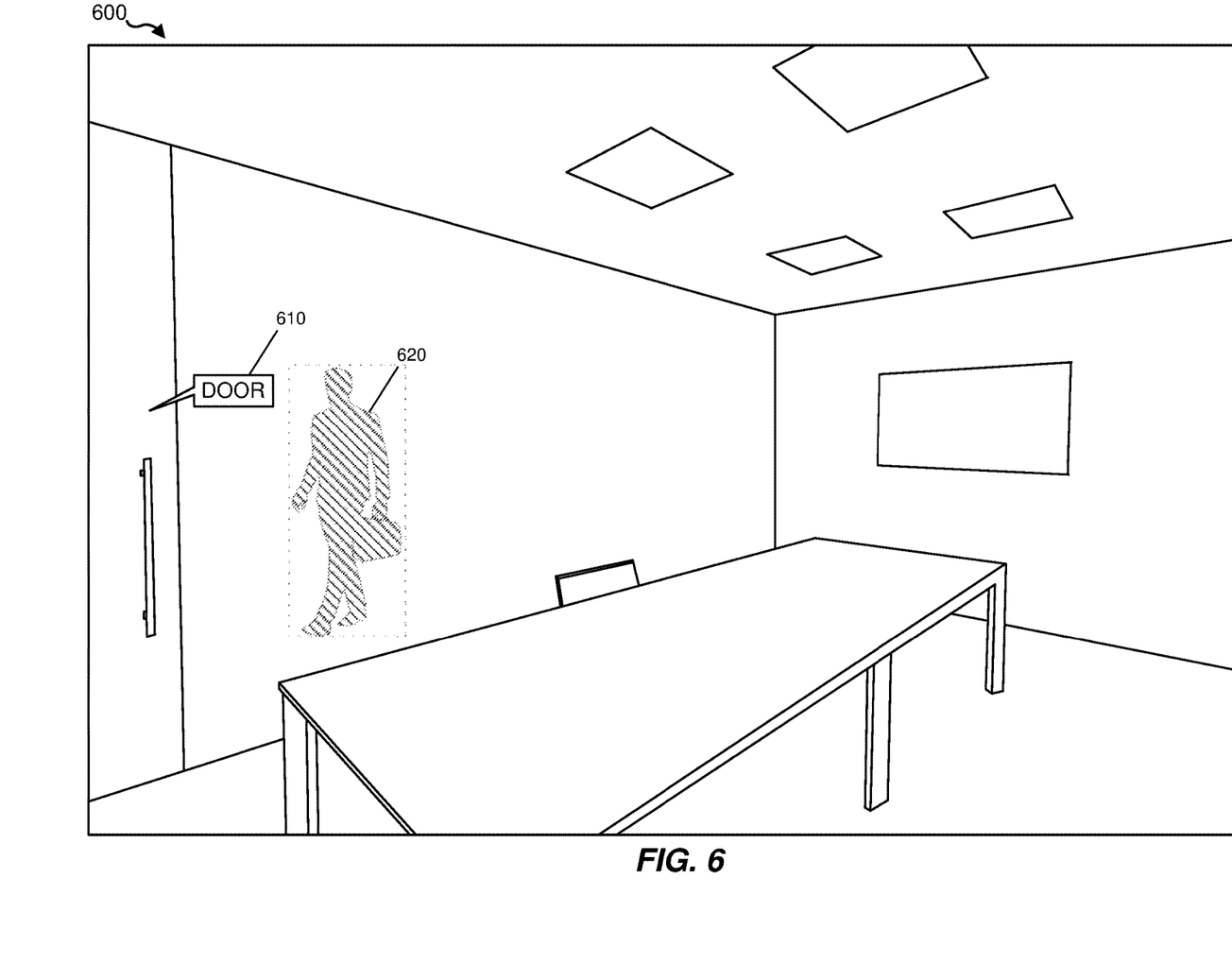
FIG. 6 is a depiction of an augmented view of the environment, according to aspects of the present disclosure.
Figure 7:
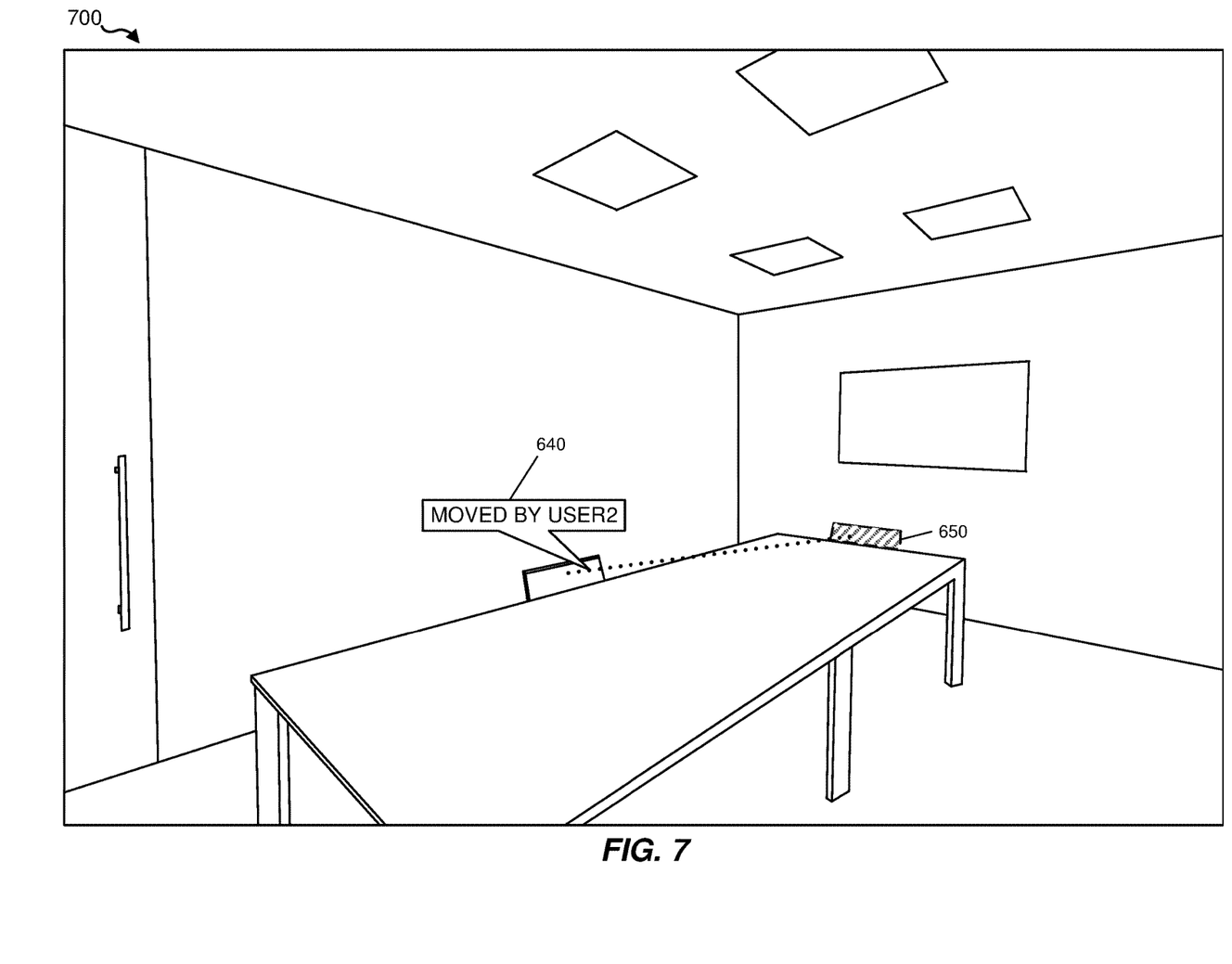
FIG. 7 is a depiction of an additional augmented view of the environment, according to aspects of the present disclosure.
Figure 8:
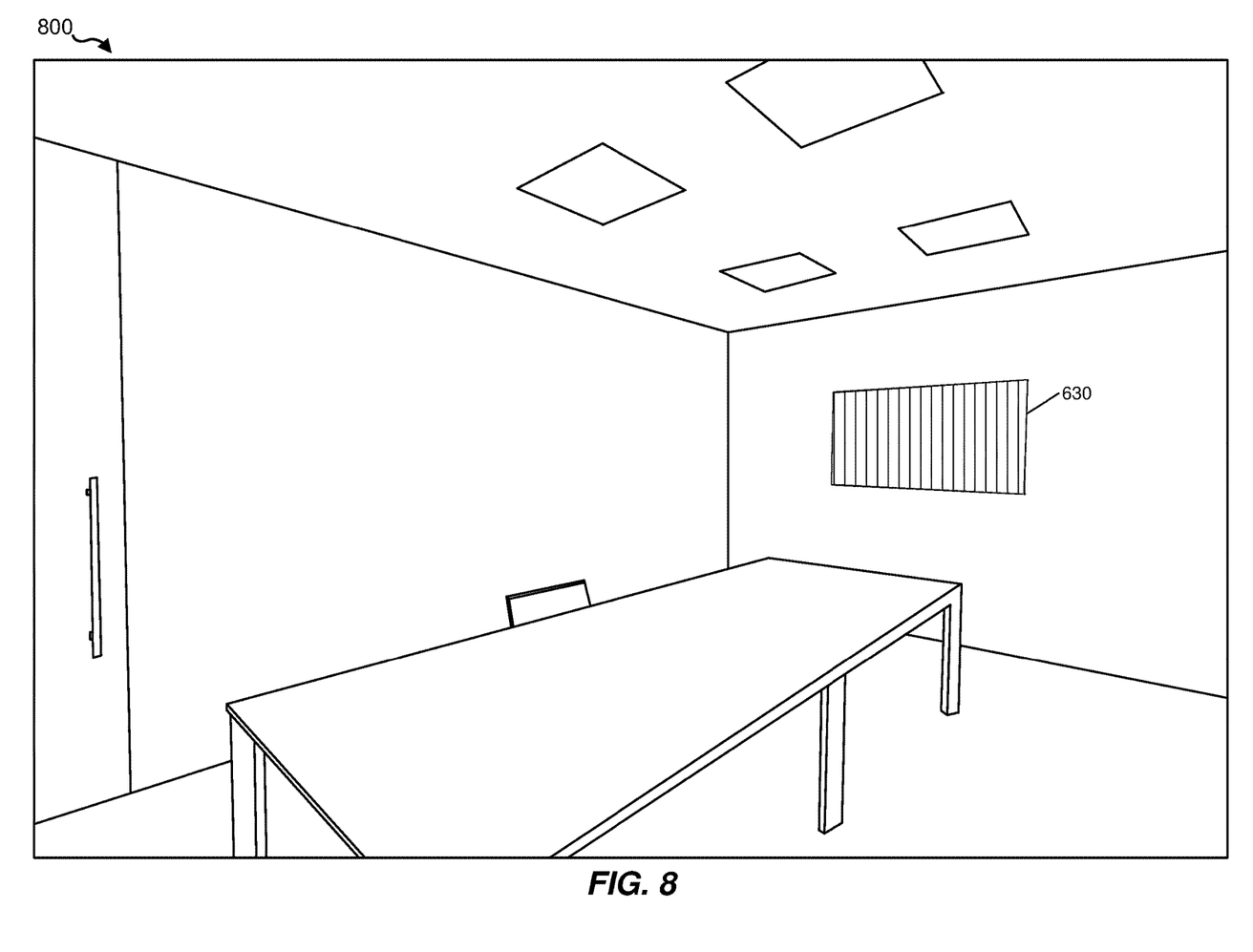
FIG. 8 is a depiction of an additional augmented view of the environment, according to aspects of the present disclosure.

FIG. 1 illustrates a flowchart of a process for rendering AR mapping data. FIG. 2 depicts an exemplary AR-mapping rendering system. FIG. 3 depicts an exemplary network environment for the AR-mapping rendering system. FIG. 4 depicts an exemplary data pipeline for an AR-mapping rendering system. FIG. 5 depicts an exemplary unmodified user view of an environment. FIGS. 6-8 depict exemplary augmented views of the environment.

FIG. 1 is a flow diagram of an exemplary computer-implemented method 100 for rendering AR mapping data. The steps shown in FIG. 1 may be performed by any suitable computer-executable code and/or computing system, including the system(s) illustrated in FIG. 2 and/or FIG. 3. In one example, each of the steps shown in FIG. 1 may represent an algorithm whose structure includes and/or is represented by multiple sub-steps, examples of which will be provided in greater detail below.

As illustrated in FIG. 1, at step 110, one or more of the systems described herein may determine a local position and a local orientation of a local device in an environment.

The systems described herein may perform step 110 in a variety of ways. FIG. 2 is a block diagram of an example system 200 for rendering AR mapping data. As illustrated in this figure, example system 200 may include one or more modules 202 for performing one or more tasks. As will be explained in greater detail below, modules 202 may include a determining module 204, a receiving module 206, a deriving module 208, and a displaying module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIG. 3 (e.g., computing device 302 and/or server 306). One or more of modules 202 in FIG. 2 may also represent all or portions of one or more special-purpose computers configured to perform one or more tasks.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintenance of the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as object data 222 and contextual settings 224. Object data 222 and/or contextual settings 224 may be stored on a local storage device, such as memory 240, or may be accessed remotely. Object data 222 may represent data received from a mapping system, as will be explained further below. Contextual settings 224 may correspond to types and parameters of contextual information available from the mapping system to be rendered to augment a user's view of the environment, as will be explained further below.

Example system 200 in FIG. 2 may be implemented in a variety of ways. For example, all or a portion of example system 200 may represent portions of example network environment 300 in FIG. 3.

FIG. 3 illustrates an exemplary network environment 300 capable of implementing various aspects of the present disclosure. As illustrated in FIG. 3, network environment 300 may include a computing device 302, a network 304, and server 306. Computing device 302 may be a client device or user device, such as an AR device (e.g., AR glasses), a desktop computer, laptop computer, tablet device, smartphone, or other computing device. Computing device 302 may include a physical processor 330, which may be one or more processors, memory 340, which may store data such as object data 222 and/or contextual settings 224, a sensor 370 capable of detecting the environment as well as a local position and local orientation of computing device 302, and a display 380. In some implementations, computing device 302 may represent an AR device such that display 380 overlays images onto a user's view of his or her local environment. For example, display 380 may include a transparent medium that allows light from the user's environment to pass through such that the user may see the environment. Display 380 may then draw on the transparent medium to overlay information. Alternatively, display 380 may project images onto the transparent medium and/or onto the user's eyes. Computing device 302 may also include, in some implementations, a speaker 382 for sound output.

Sensor 370 may include a gyroscope, an accelerometer, a global positioning system (GPS) sensor, and/or other sensors capable of determining the local position and local orientation of computing device 302. Sensor 370 may also include one or more sensors, such as a camera, a microphone, and other sensors capable of detecting features and/or objects in the environment, which may be sent to server 306.

Server 306 may represent or include one or more servers capable of hosting a mapping system. The mapping system may process real-time data from computing device 302 and other devices (not depicted) to build, maintain, and/or update the mapping system. In some examples, the mapping system may include mapping data for structural features of the environment and object data for objects in the environment. The object data may include state data for objects in the environment and relationship data for relationships between the objects. The state data may represent data which may describe a condition of an object with respect to attributes and/or circumstances. The relationship data may represent data which may describe relationships between objects. The mapping system may recreate the entire environment with the mapping data and the object data. In some examples, the mapping system may represent an AR mapping system, which may process data for display on AR devices. The server 306 may include a physical processor 330, which may include one or more processors, memory 340, which may store modules 202, and additional elements 220, such as object data 222.

Computing device 302 may be communicatively coupled to server 306 through network 304. Network 304 may represent any type or form of communication network, such as the Internet, and may comprise one or more physical connections, such as LAN, and/or wireless connections, such as WAN.

Returning to FIG. 1, in one example, determining module 204 of computing device 302 may, using sensor 370, determine the local position and the local orientation of computing device 302 in an environment. The environment may be an environment mapped by server 306, such as a single level of a building. In some implementations, computing device 302 may send the local position and the local orientation to server 306.

FIG. 4 shows an exemplary pipeline 400 depicting data flow for rendering AR mapping data. As shown in this figure, FIG. 4 may include a mapping system 406, which may correspond to server 306, and a local device 402, which may correspond to system 200 and/or computing device 302. Local device 402 may determine local position and orientation 472. In some examples, local position and orientation 472 may be determined with respect to a coordinate system defined by mapping system 406, or a global coordinate system such as latitude and longitude. The orientation may indicate a direction the user is facing such that the user's view of the environment may be determined from local position and orientation 472. In some examples, local position and orientation 472 may be determined remotely. Local device 402 may send data to a remote device, such as server 306 and/or mapping system 406, which may then extrapolate local position and orientation 472. For instance, local device 402 may send image data to mapping system 406, which may determine local position and orientation 472 may recognizing objects in the image data.

Mapping system 406 may maintain data about the environment through map database 450, contextual information database 452, and object database 454. Map database 450 may include structural details and other static features of the environment. Object database 454 may include data regarding objects detected in the environment, such as types of objects. Objects in the environment may include inanimate objects, humans, and/or other recognizable objects. In some examples, the objects may also include virtual objects, such as objects that have been added to the environment without sensor detection. Contextual information database 452 may include data regarding attributes of the objects in the environment, such as location data, state data, and relationship data between objects. Mapping system 406 may receive real-time data from devices in the environment, such as local device 402, to maintain the databases. As will be explained in greater detail below, these databases may allow mapping system 406 to recreate the entire environment, including past states of the environment.

In one example, local device 402 may send local position and orientation 472 to mapping system 406. Mapping system 406 may then select one or more objects from object database 454 based on local position and orientation 472. In some cases, mapping system 406 may select objects in proximity with and/or within view of local device 402. For example, mapping system 406 may determine that local device 402 is in a room and may select objects in the room. In certain implementations, local device 402 may send also contextual settings, such as contextual settings 224 in FIG. 2, to mapping system 406.

Contextual settings 224 may indicate what types of contextual information the user may wish to be rendered. Because mapping system 406 may maintain data of the environment beyond what local device 402 may detect, the user may take advantage of mapping system 406 to receive contextual information regarding objects in the environment that the user would not normally perceive. Contextual settings may include settings for identifying objects, hiding visible objects, showing occluded objects, showing past states of objects, showing current states of objects, identifying interactions between objects, and/or playing audio outside of detection by the local device, among many other types of contextual information.

In one example, mapping system 406 may select objects that satisfy the contextual settings. For example, mapping system 406 may select an object outside of the room in which local device 402 is located if the contextual settings indicate that a user wishes to see objects that would normally not be visible to the user. In certain implementations, the contextual settings may identify specific objects the user may have selected.

Mapping system 406 may also select relevant object data from contextual information database 452 for the selected objects. In some implementations, mapping system 406 may select all data available relating to the selected objects. In other implementations, mapping system 406 may select data based on the contextual settings. For example, if the contextual settings indicate that a user wishes to see identifying information for objects, mapping system 406 may select identifying information, such as labels or names, for the selected objects. If the contextual settings indicate that a user wishes to see occluded objects, mapping system 406 may select position and orientation data for the occluded objects. If the contextual settings indicate that a user wishes to see past and/or current states of objects, mapping system 406 may select data describing the relevant states of the objects. If the contextual settings indicate that a user wishes to see interactions between objects, mapping system 406 may select relationship data between the objects. If the contextual settings indicate that a user wishes to hear audio outside of detection by the local device, mapping system 406 may select audio files, which may be related to objects outside of the user's view. By selecting data based on the contextual settings, the disclosed methods may reduce and/or limit an amount of data mapping system 406 may need to send to local device 402.

Returning to FIG. 1, at step 120, one or more of the systems described herein may receive, by the local device and from a mapping system, object data for a plurality of objects within the environment. The object data may include position data and orientation data for each of the plurality of objects and relationship data between the plurality of objects. For example, receiving module 206 of computing device 302 may receive object data 222 from server 306.

Object data 222 may include position data and orientation data for the objects, which may be defined with respect to a coordinate system of the mapping system or a global coordinate system. In some examples, the position and orientation data may provide computing device 302 with spatial awareness of the objects with respect to computing device 302. The relationship data between the objects may also indicate how objects have interacted, for example if one object was placed on another object, if one object repositioned another object, if one object modified another object, etc.

The systems described herein may perform step 120 in a variety of ways. In one example, referring to FIG. 4, mapping system 406 may send data, previously selected as described above, from map database 450, contextual information database 452, and/or object database 454 to local device 402. Local device 402 may then receive the data and process the data locally.

In some examples, local device 402 may include a local artificial intelligence (AI) agent 460, a local map database 456, a local contextual information database 458, and a local object database 422. In one embodiment, local map database 456, local contextual information database 458, and local object database 422 may represent local versions of map database 450, contextual information database 452, and/or object database 454, respectively. In this embodiment, the local databases may allow local device 402 to recreate a localized version of the environment. The local databases may be maintained by local AI agent 460, which may receive the data from mapping system 406 and accordingly update the local databases. The local databases may be limited in scope (for example, limited to a proximity of local device 402). In some examples, local AI agent 460 may flush from the local databases data relating to objects that may be spatially and/or temporally no longer relevant to local device 402.

The local databases may include data of the environment detected by local device 402. In some situations, local AI agent 460 may encounter inconsistencies and/or conflicts with the data received from mapping system 406. In these cases, local AI agent 460 may resolve such conflicts by prioritizing data; for example, by prioritizing data detected by local device 402, prioritizing based on time, etc.

Returning to FIG. 1, at step 130, one or more of the systems described herein may derive, based on the object data received from the mapping system, the local position of the local device, and the local orientation of the local device, a contextual rendering of at least one of the plurality of objects that provides contextual data that modifies a user's view of the environment. For example, deriving module 208 may derive the above-described contextual rendering.

In one example, deriving module 208 may derive the contextual rendering such that objects are scaled to a specific size to simulate distance, based on the object's position with respect to the local position. The objects may be rendered in a pose based on the object's orientation and the local position and orientation. For example, an object facing away from computing device 302 may be rendered as such based on the local orientation. The contextual rendering, when overlaid onto the user's view of the environment, may be consistent with the user's view.

For example, in FIG. 4, local device 402 may use local position and orientation 472 as well as data from local map database 456, local contextual information database 458, and local object database 422 to derive contextual rendering 426. Contextual rendering 426 may also be derived based on other factors, such as contextual settings.

The systems described herein may perform step 130 in a variety of ways. In one example, the contextual rendering may be derived based on contextual settings, such as contextual settings 224. Contextual settings 224 may include settings for displaying, as part of the contextual rendering, additional contextual information about the environment which may not be apparent to the user in the user's view of the environment. Contextual settings 224 may apply to all objects or may differ from object to object. This contextual information may be made possible or available because of the mapping system, which tracks and maintains data on the environment and objects therein. Contextual settings 224 may indicate any of a variety of different types and forms of contextual information that could be used to augment a user's perception of their local environment. For example, contextual settings 224 may include an indication to identify objects, for example by having generic labels or specific names of objects appear next to the objects. Contextual settings 224 may also include an indication to hide visible objects, for example by making specified objects transparent. Contextual settings 224 may also include an indication to show occluded objects, for example by rendering objects that would normally be blocked in the user's view. Contextual settings 224 may additionally include an indication to show past states of objects, for example by showing previous locations of objects or showing animated renderings of prior object movements. In addition, contextual settings 224 may include an indication to show current states of objects, for example by showing different views of the current state of objects or highlighting features of the objects. Contextual settings 224 may also include an indication to identify interactions between objects, such as by labeling interactions or showing animated renderings of interactions. In addition, contextual settings 224 may include an indication to play audio outside of detection by the local device, for example if live audio is associated with an object normally outside of hearing distance from the user.

Based on the contextual settings, the step of deriving the contextual rendering may include additional steps, including steps of determining whether at least one of the plurality of objects is occluded in the user's view of the environment based on both the local position and the local orientation of the local device and the position data of at least one of the plurality of objects. The additional steps may include rendering a contextual representation of at least one of the plurality of objects when at least one of the plurality of objects is occluded in the user's view of the environment and the contextual settings indicate that a user wishes to view occluded objects. For example, computing device 302 may determine that an object is behind a wall, based on its local position and orientation. In this example, the contextual representation may include a contextual representation of the object consistent with the user's view as if the wall were not present. For example, the contextual representation may be an outline rendering, an opaque rendering, a transparent rendering, an icon, or a combination thereof.

Based on the contextual settings, the step of deriving the contextual rendering may include additional steps, including steps of determining whether at least one of the plurality of objects is visible in the user's view of the environment based on both the local position and the local orientation of the local device and the position data of the at least one of the plurality of objects. The additional steps may include rendering a contextual representation of at least one of the plurality of objects when at least one of the plurality of objects is visible in the user's view of the environment and the contextual settings indicate hiding visible objects. For example, computing device 302 may determine that an object is in the user's view, for example by identifying the object visually. The contextual representation may be an outline rendering, a transparent rendering, an icon, or a combination thereof, among many other potential examples. The contextual rendering may therefore render portions of the view behind the object as if the object were not present.

Based on the contextual settings, the step of deriving the contextual rendering may include additional steps, including determining, based on the contextual settings, whether to render additional contextual data related to at least one of the plurality of objects, and including, in the contextual rendering, the additional contextual data. The additional contextual data may include a rendering corresponding to a past state, an indication of an interaction between objects, an audio file, or a combination thereof, among other potential examples. Such renderings may include, for example, animated renderings showing past states leading up to current states, static icons and/or symbols related to past locations, animated renderings for interactions between objects, static icons and/or symbols indicating interactions, etc. The animated renderings may be played in a short loop or may be played once.

Returning to FIG. 1, at step 140, one or more of the systems described herein may display, using the local device, the contextual rendering of at least one of the plurality of objects to modify the user's view of the environment. For example, displaying module 210 may display, using display 380 of computing device 302, the contextual rendering. The contextual rendering may not interfere with the user's view of the environment and instead may overlay contextual information to augment the user's view.

The systems described herein may perform step 140 in a variety of ways. In one example, local device 402 may display contextual rendering 426 on display 480. A user's view 500 of the environment, which may be a view of a room in which the user is located as depicted in FIG. 5, may be modified by contextual rendering 426. FIGS. 6-8 show a user's augmented views 600, 700, and 800 of the environment. FIGS. 6-8 depict various examples of contextual information, although in other implementations, different combinations of types of contextual information may be displayed.

Label 610, depicted in FIG. 6, may include a textual label for a specific object, such as a door in user's view 500. In other implementations, object identification may be graphical, such as using icons, which may also be combined with text. Object identification may highlight the object in other ways, such as by outlining the object or changing colors of the object. Labels may be placed on or near the object. Labels may accordingly move as the user's view changes, to remain pinned to the object.

Hidden object 620, depicted in FIG. 6, may include a contextual representation of an object, such as a person, occluded from view, such as behind a wall in user's view 500. Hidden object 620 may be rendered as oriented with respect to the user's view. Hidden object 620 may be rendered normally as if the wall were not present, or may be altered to indicate hidden object 620 is normally occluded. For example, hidden object 620 may be rendered as an outline, different colors, transparent, etc. Hidden object 620 may be rendered static, such as its last known location, or may be rendered in real-time as it moves.

Visible object 630, depicted in FIG. 8, may include a contextual representation of an object as if it were not visible. For example, a monitor normally visible in user's view 500 may be rendered invisible, by rendering the wall behind it. Visible object 630 may be rendered completely invisible, such that there is no indication of visible object 630, or may be rendered to reduce its visibility. For example, visible object 630 may be rendered as just an outline, or partially transparent. As the user moves and changes his view, visible object 630 may accordingly update. The wall behind visible object 630 may be rendered based on data from the mapping system, which may include textures and/or other graphical data for objects in the environment.

Interaction 640, depicted in FIG. 7, may include various indicators to depict object interactions. For example, in user's view 500, the user may only be aware of a chair's current position. However, the mapping system may be aware of the chair's previous state, and how it was moved to its current location. Interaction 640 includes a textual label indicating that the chair was moved by user2. Interaction 640 may further include a dotted line connecting past state 650 of the chair and its current position. Past state 650 may be rendered as an outline, transparent rendering, icon, label, or a combination thereof. In other implementations, interaction 640 may depict the interaction in other ways, such as through animation showing user2 moving the chair.

In some implementations, in addition to visual renderings, audio renderings may be played. For instance, computing device 302 may play audio on speaker 382. In FIG. 6, hidden object 620 may be a person wearing an AR device with a microphone enabled by hidden object 620. The user may not normally be able to hear hidden object 620 from inside the room. However, the mapping system may receive audio data from hidden object 620 such that the user may be played the audio data and "hear" hidden object 620 from inside the room.

Although FIGS. 6-8 illustrate various contextual renderings to augment the user's view, in other examples, the contextual renderings may include different combinations of contextual settings. For instances, FIGS. 6-8 may be rendered in a single contextual rendering.

As detailed above, the disclosed mapping system may provide a number of unique advantages to end users. For example, the disclosed systems may be used to keep track of objects (such as a user's possessions) within an environment. For instance, a user may be able to locate missing objects such as his or her keys, laptop, etc. Even if the mapping system lacks the most current data for the missing objects, the user may be able to ascertain the last known locations to find the missing objects. Alternatively, the user may be able to examine previous locations of the missing objects to track their movements and extrapolate their current locations. The user may also be able to look around the environment and locate the missing objects visually using his or her AR device. For example, the AR device may highlight an object when the user faces the object or may display direction indicators to point the user towards the object.

The user may also be able to determine which objects and/or persons have interacted with objects. For instance, the user may see that a second person used the user's laptop before the laptop went missing. The user may then be able to ask the second person about the laptop's current whereabouts. The user may be able to locate the second person, as well. For instance, if a second person is wearing an AR device, the user may be able to see where the second person is in real time and ascertain where the second person has been and who or what the second person has interacted with. If the second person is not wearing an AR device, the user may be able to determine where the second person has been, the second person's movement habits throughout the environment, and estimate where the second person currently is.

The disclosed systems may also enable users to create virtual objects for other users to interact with. For example, a user may create a virtual note and leave it on a wall. A second user, using an AR device, may be able to see the virtual note.

In sum, the disclosed systems may augment a user's view of his or her environment in a variety of ways. For example, an AR device (such as AR glasses) may be connected to a mapping system, which may collect and aggregate data from various devices in the environment to maintain a nearly complete digital recreation of the environment. The AR glasses may then send data about itself, such as its location and orientation to the mapping system. The mapping system may then provide the AR glasses with additional contextual information about the environment that the user may not normally perceive. Thus, by wearing the AR glasses, the user may be able to observe a variety of contextual information that would not normally be physically possible, such as seeing through walls, seeing the past with respect to objects in the environment, quickly identifying objects, and hearing through walls, among an almost limitless number of other potential scenarios.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive object data to be transformed, transform the object data, use the result of the transformation to derive a contextual rendering, and display the contextual rendering to augment a user's view. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   determining a local position and a local orientation of a local device in an environment;
   receiving, by the local device and from a mapping system, object data for a plurality of objects within the environment, wherein the object data includes position data and orientation data for each of the plurality of objects and relationship data between the plurality of objects;
   deriving, based on the object data received from the mapping system, the local position of the local device, the local orientation of the local device, and contextual settings, a contextual rendering of at least one of the plurality of objects that provides contextual data that modifies a user's view of the environment, wherein the contextual settings indicate the contextual data to include an object interaction that includes a description of both a change from a past state of the at least one of the plurality of objects to a current state of the at least one of the plurality of objects and which of the plurality of objects caused the change, and wherein the object interaction is determined from the relationship data; and
   displaying, using the local device, the contextual rendering of at least one of the plurality of objects to modify the user's view of the environment.

2. The method of claim 1, further comprising:
   sending, to the mapping system, the local position and the local orientation of the local device;
   selecting, by the mapping system, the plurality of objects based on the local position and the local orientation of the local device; and
   selecting, by the mapping system, the object data for the selected plurality of objects.

3. The method of claim 2, wherein selecting the object data for the plurality of objects is further based on contextual settings.

4. The method of claim 1, wherein the contextual settings include at least one of identifying objects, hiding visible objects, showing occluded objects, showing past states of objects, showing current states of objects, identifying interactions between objects, or playing audio outside of detection by the local device.

5. The method of claim 4, wherein deriving the contextual rendering comprises:
   determining whether at least one of the plurality of objects is occluded in the user's view of the environment based on both the local position and the local orientation of the local device and the position data of at least one of the plurality of objects; and
   rendering a contextual representation of at least one of the plurality of objects when at least one of the plurality of objects is occluded in the user's view of the environment and the contextual settings indicate showing occluded objects.

6. The method of claim 5, wherein the contextual representation comprises at least one of an outline rendering, an opaque rendering, a transparent rendering, or an icon.

7. The method of claim 4, wherein deriving the contextual rendering comprises:
   determining whether at least one of the plurality of objects is visible in the user's view of the environment based on both the local position and the local orientation of the local device and the position data of the at least one of the plurality of objects; and
   rendering a contextual representation of at least one of the plurality of objects when at least one of the plurality of objects is visible in the user's view of the environment and the contextual settings indicate hiding visible objects, wherein the contextual representation comprises at least one of an outline rendering, a transparent rendering, or an icon.

8. The method of claim 4, wherein deriving the contextual rendering comprises:
   determining, based on the contextual settings, whether to render additional contextual data related to at least one of the plurality of objects; and
   including, in the contextual rendering, the additional contextual data.

9. The method of claim 8, wherein the additional contextual data comprises at least one of a rendering corresponding to a past state, an indication of an interaction between objects, or an audio file.

10. The method of claim 1, wherein the plurality of objects includes a virtual object.

11. A system comprising:
    one or more processors;
    a memory comprising instructions that when executed by the one or more processors cause the system to:
       determine a local position and a local orientation of a local device in an environment;
       receive, by the local device and from a mapping system, object data for a plurality of objects within the environment, wherein the object data includes position data and orientation data for each of the plurality of objects and relationship data between the plurality of objects;
       derive, based on the object data received from the mapping system, the local position of the local device, the local orientation of the local device, and contextual settings, a contextual rendering of at least one of the plurality of objects that provides contextual data that modifies a user's view of the environment, wherein the contextual settings indicate the contextual data to include an object interaction that includes a description of both a change from a past state of the at least one of the plurality of objects to a current state of the at least one of the plurality of objects and which of the plurality of objects caused the change, and wherein the object interaction is determined from the relationship data; and
       display, using the local device, the contextual rendering of at least one of the plurality of objects to modify the user's view of the environment.

12. The system of claim 11, wherein the instructions further comprise instructions for:
sending, to the mapping system, the local position and the local orientation of the local device;
selecting, by the mapping system, the plurality of objects based on the local position and the local orientation of the local device; and
selecting, by the mapping system, the object data for the selected plurality of objects.

13. The system of claim 11, wherein the contextual settings include at least one of identifying objects, hiding visible objects, showing occluded objects, showing past states of objects, showing current states of objects, identifying interactions between objects, or playing audio outside of detection by the local device.

14. The system of claim 13, wherein deriving the contextual rendering comprises:
determining whether at least one of the plurality of objects is occluded in the user's view of the environment based on both the local position and the local orientation of the local device and the position data of at least one of the plurality of objects; and
rendering a contextual representation of at least one of the plurality of objects when at least one of the plurality of objects is occluded in the user's view of the environment and the contextual settings indicate showing occluded objects, wherein the contextual representation comprises at least one of an outline rendering, an opaque rendering, a transparent rendering, or an icon.

15. The system of claim 13, wherein deriving the contextual rendering comprises:
determining whether at least one of the plurality of objects is visible in the user's view of the environment based on both the local position and the local orientation of the local device and the position data of the at least one of the plurality of objects; and
rendering a contextual representation of at least one of the plurality of objects when at least one of the plurality of objects is visible in the user's view of the environment and the contextual settings indicate hiding visible objects, wherein the contextual representation comprises at least one of an outline rendering, a transparent rendering, or an icon.

16. The system of claim 13, wherein deriving the contextual rendering comprises:
determining, based on the contextual settings, whether to render additional contextual data related to at least one of the plurality of objects; and
including, in the contextual rendering, the additional contextual data, wherein the additional contextual data comprises at least one of a rendering corresponding to a past state, an indication of an interaction between objects, or an audio file.

17. A non-transitory computer-readable medium comprising computer-readable instructions that, when executed by at least one processor of a computing device, cause the computing device to:
determine a local position and a local orientation of a local device in an environment;
receive, by the local device and from a mapping system, object data for a plurality of objects within the environment, wherein the object data includes position data and orientation data for each of the plurality of objects and relationship data between the plurality of objects;
derive, based on the object data received from the mapping system, the local position of the local device, the local orientation of the local device, and contextual settings, a contextual rendering of at least one of the plurality of objects that provides contextual data that modifies a user's view of the environment, wherein the contextual settings indicate the contextual data to include an object interaction that includes a description of both a change from a past state of the at least one of the plurality of objects to a current state of the at least one of the plurality of objects and which of the plurality of objects caused the change, and wherein the object interaction is determined from the relationship data; and
display, using the local device, the contextual rendering of at least one of the plurality of objects to modify the user's view of the environment.

18. The computer-readable medium of claim 17, further comprising instructions for:
sending, to the mapping system, the local position and the local orientation of the local device;
selecting, by the mapping system, the plurality of objects based on the local position and the local orientation of the local device; and
selecting, by the mapping system, the object data for the selected plurality of objects.

19. The computer-readable medium of claim 17, wherein the contextual settings include at least one of identifying objects, hiding visible objects, showing occluded objects, showing past states of objects, showing current states of objects, identifying interactions between objects, or playing audio outside of detection by the local device.

20. The computer-readable medium of claim 19, wherein deriving the contextual rendering comprises:
determining, based on the contextual settings, whether to render additional contextual data related to at least one of the plurality of objects; and
including, in the contextual rendering, the additional contextual data, wherein the additional contextual data comprises at least one of a rendering corresponding to a past state, an indication of an interaction between objects, or an audio file.

* * * * *